United States Patent [19]

Albrecht et al.

[11] Patent Number: 5,625,510
[45] Date of Patent: Apr. 29, 1997

[54] HIGH TORSIONAL STIFFNESS LOW AXIAL DEFLECTION STIFFNESS DRIVE SHAFT

[75] Inventors: Thomas R. Albrecht, San Jose; James H. Eaton, Morgan Hill, both of Calif.

[73] Assignee: International Business Machines Corporation, Armonk, N.Y.

[21] Appl. No.: 474,646

[22] Filed: Jun. 7, 1995

Related U.S. Application Data

[63] Continuation of Ser. No. 252,144, Jun. 1, 1994, Pat. No. 5,490,020, which is a continuation of Ser. No. 74,898, Jun. 10, 1993, abandoned.

[51] Int. Cl.$^6$ ............................................. G11B 15/32
[52] U.S. Cl. ................................. 360/96.5; 360/96.3
[58] Field of Search ............................ 360/96.3, 96.5, 360/96.1, 98.07, 99.08, 99.11; 464/93, 98, 99, 100, 101; 242/340, 342, 349, 352

[56] References Cited

U.S. PATENT DOCUMENTS

| | | | |
|---|---|---|---|
| 2,182,711 | 12/1939 | Thomas | 64/13 |
| 3,589,636 | 6/1971 | Brown | 242/597.7 |
| 3,883,090 | 5/1975 | Hall, Sr. | 242/340 |
| 4,000,866 | 1/1977 | Schulz | 242/571.8 |
| 4,421,496 | 12/1983 | Emerson et al. | 464/95 |
| 4,562,497 | 12/1985 | Moriuaga et al. | 360/96.3 |
| 4,737,136 | 4/1988 | Fedem | 464/99 |

FOREIGN PATENT DOCUMENTS

61-197822A  2/1986  Japan.

*Primary Examiner*—Stuart S. Levy
*Assistant Examiner*—David L. Ometz
*Attorney, Agent, or Firm*—Baker, Maxham, Jester & Meador

[57] ABSTRACT

A high torsional stiffness low axial deflection stiffness flexible drive shaft apparatus is provided for driving a magnetic tape cassette and includes a drive shaft having opposite ends, a device for engaging the magnetic tape cassette and a pair of flexible diaphragms. A device is connected to one of the drive shaft ends, one of the flexible diaphragms, and is connectable to a motor for transmitting torsional force from the motor to the drive shaft via the flexible diaphragm. Another device is connected to the other end of the drive shaft, the other flexible diaphragm and the tape cassette engaging device for transmitting torsional force from the drive shaft to the engaging device via the other flexible diaphragm. Because the diaphragms are too delicate to handle thrust loads and because the torsional stiffness of the diaphragm degrades rapidly as its center is displaced axially with respect to the outer driving points, a device is operably connected to each torsional force transmitting device for transmitting thrust loads exerted along the axes of rotation of the drive apparatus. With this arrangement the drive apparatus can easily adapt for misalignment of the drive apparatus with the magnetic tape cassette to deliver a reliable rotating force.

16 Claims, 7 Drawing Sheets

HIGH TORSIONAL STIFFNESS LOW AXIAL DEFLECTION STIFFNESS DRIVE SHAFT

This application is a continuation of application Ser. No. 08/252,144 filed Jun. 1, 1994, now U.S. Pat. No. 5,490,020 which is a continuation of abandoned application Ser. No. 74,898, filed Jun. 10, 1993.

BACKGROUND OF THE INVENTION

1. Field of the Invention

The invention relates to a high torsional stiffness low axial deflection stiffness flexible drive shaft for rotating recordable media, such as magnetic tapes or discs or video disks.

2. Discussion of the Related Art

There are at least three options for coupling a drive motor to one or more tape reels in a tape drive. The general problem of off-center drive exists in all cases, but is handled in different ways. The first option is a data cartridge which uses a belt drive. Although the belt inside the cartridge has more function than just solving the off-center drive problem, it is nevertheless one way to solve the problem. The second option, which is used in all audio and video cassette systems is to allow the tape reel to "float" inside the cartridge. The tape reels in such systems do not rotate on axes that are rigidly attached to the cartridge. The reels can move within a certain range to align with the drive axes. Usually the engagement method has some kind of self-centering device, such as spider gears, or the reel is allowed to wobble a little (audio and video tape cassettes). The third option is to have the tape reels rotate on axes that are rigidly connected to the cassette housing, and allow the drive shafts axes to adjust to the cassette reels. The advantage of this kind of system is that a precision tape path can be defined totally inside the cassette for excellent guiding, low debris generation, etc. Note that the first option also has the tape path totally defined inside the cassette.

In the third option, each reel includes an axle with a bearing that is designed to have a close fit; however the axle will rock slightly if the tape driving mechanism ("tape drive") is not aligned with it. This rocking motion results in an unreliable tape path which, in turn, causes low quality recording or playing of the magnetic tape.

Some magnetic tape cassettes have a gear connected to each reel axle. In a like manner, the tape drive has a pair of drive gears, each drive gear being engageable with a respective reel axle gear to implement the tape driving function. In addition to low quality tape performance, misalignment between the drive system and the reel axles further results in improper meshing of the gears. This improper meshing causes wear of the gears and creates debris which can adversely affect system performance.

The off-center drive problem is a classic mechanical problem, with numerous solutions existing in the prior art. For example, automobile drive trains often use a pair of universal joints and a telescoping joint to solve the problem. Farm implements and other heavy machinery commonly use elastic joints to accommodate offsets. Precision equipment often employ bellows couplings, Oldham couplings, and spider couplings. None of these prior art teachings solves the cassette offset drive problem. A tape drive for a magnetic tape cassette must have high torsional stiffness and low axial deflection stiffness, and yet must be capable of supporting a thrust load. The high torsional stiffness is required to rotate the cassette reel and the low axial deflection stiffness is required to prevent the exertion of tipping torque on the reel axle. Tipping torque that is too large is what causes the reel to rock back and forth. The difficult problem is in providing low axial deflection stiffness and at the same time supporting the necessary thrust load to make driving engagement. The tape drive must also deliver a constant velocity with low drag. This is necessary in order to obtain a reliable tape path for recording or playing the magnetic media. Further, exacting engagement between the tape drive and each cassette drive axis is necessary to minimize gear wear and debris generation.

Many of the aforementioned problems associated with magnetic tape drives also apply to magnetic or video disk drives. These drives receive magnetic or optical disks. Such disks normally have a central aperture which engages a drive system grabette, the grabette being powered for rotating the disk. Alignment between the disk drive and the central axis of a disk is necessary to prevent any rocking motion which will impact on any play or record path.

SUMMARY OF THE INVENTION

The present invention overcomes the aforementioned problems associated with prior art recordable media drives by providing a flexible drive shaft apparatus which will reliably rotate the recordable media for a transport function (such as search or wind/rewind) and a play or record operation even though there is an axis misalignment between the drive shaft and the recordable media reel. The problem is especially troublesome with a magnetic tape cassette which has a pair of reels mounted on axles which are fixed to the cassette housing. The present invention overcomes the offset problem between a tape drive and cassette reel axles by providing a unique combination of elements. The combination includes a drive shaft which has opposite drive ends along an axis of rotation, an engaging device, such as a gear, which has an axis of rotation, and a pair of flexible diaphragms. An important feature of the invention is how these various elements are connected together which leads to important connecting devices of the invention. One set of components is connected to one of the ends of the drive shaft, to a first one of the flexible diaphragms and is further connectable to a rotational power source, such as a motor. The feature of this set of connecting components is that it transmits torsional force from the motor to the drive shaft via the flexible diaphragm. Another set of components is connected to the other end of the drive shaft, a second one of the flexible diaphragms and the engaging device, such as the aforementioned gear. This set of components transmits torsional force from the drive shaft to the engaging device via the other flexible diaphragm. At this point it can be seen that the flexible diaphragms are important elements of the invention because each, on its own, transmits the torsional force necessary to drive the recordable media. The invention uniquely configures these flexible diaphragms so that they will deflect easily for axis offset and yet have high torsional stiffness transmitting torque to rotate the recordable media. The torsional stiffness degrades rapidly as the center of the diaphragm moves out of the plane of the outer attachment points. In order to overcome this problem the invention uniquely provides a device associated with each diaphragm for transmitting axial thrust loads and maintaining the center of the diaphragm in the plane of the outer attachment points.

An object of the present invention is to provide a flexible drive shaft system which can easily and reliably deflect to adapt for misalignment or axes offset between the drive system end the article to be driven.

Another object is to provide a high torsional stiffness low axial deflection stiffness flexible drive shaft system for reliably rotating recordable media.

A further object is to provide a high torsional stiffness low axial deflection stiffness flexible drive shaft apparatus which will reliably drive magnetic tape cassette reels even though the axes of the tape drive and any reel axis may be offset.

Still another object is to provide a reliable system for playing and/or recording recordable media.

Still a further object is to provide a unique flexible diaphragm which may be used for a flexible drive system.

These and other objects will be better understood from the following detailed description, taken together with the below described drawings.

DETAILED DESCRIPTION OF THE PREFERRED EMBODIMENTS

The following figures show the invention as applied to a magnetic tape device in which information is typically written to and read from a tape by known magnetic or optical procedures. Such tapes are spooled on individual reels and in single or dual reel-type tape containers which are known as "cassettes" or "cartridges". The tape path defined for any type of tape by a cartridge and a tape drive includes a tape head in close proximity to the tape and having one or more transducer elements for writing to and/or reading from the tape. The tape is driven past the tape head by rotation of the reel or reels in a tape container.

Figure 1:
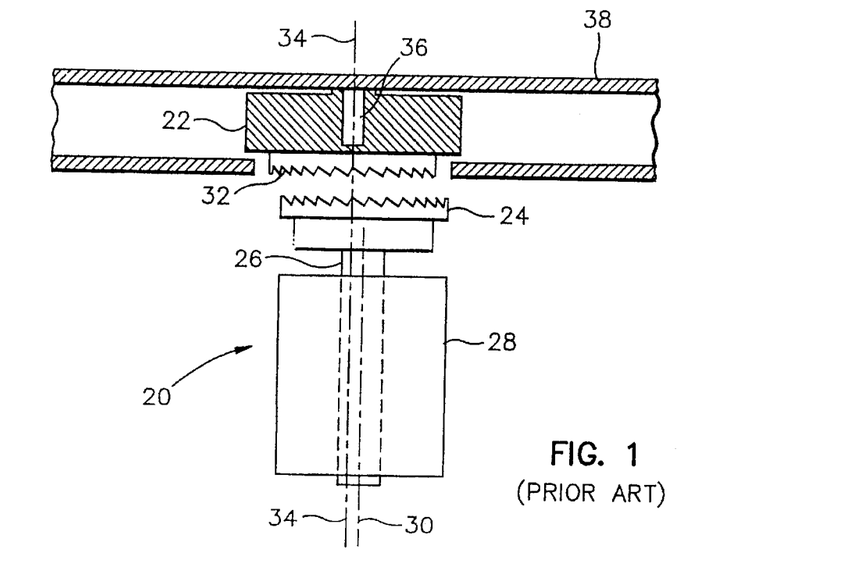
FIG. 1 is a schematic illustration which provides background information.

Referring now to the drawings wherein like reference numerals designate like or similar parts throughout the several views there is illustrated in FIG. 1 an apparatus 20 for driving a tape reel 22. The tape drive apparatus 20 includes a spider gear 24 which is connected to an output shaft 26 of a motor 28. The output shaft 26 has an axis of rotation 30. The tape reel includes a spider gear 32, and is mounted for rotation about an axis 34 by an axle 36 which is connected to a cassette housing 38. As can be seen from FIG. 1, the motor shaft axis 30 and the reel axis 34 are misaligned. This will cause the spider gears 24 and 32 to improperly mesh. The result is rocking of the tape reel 22 on its axis 34 and wear between the gears. This is unacceptable for high performance systems.

Figure 2:
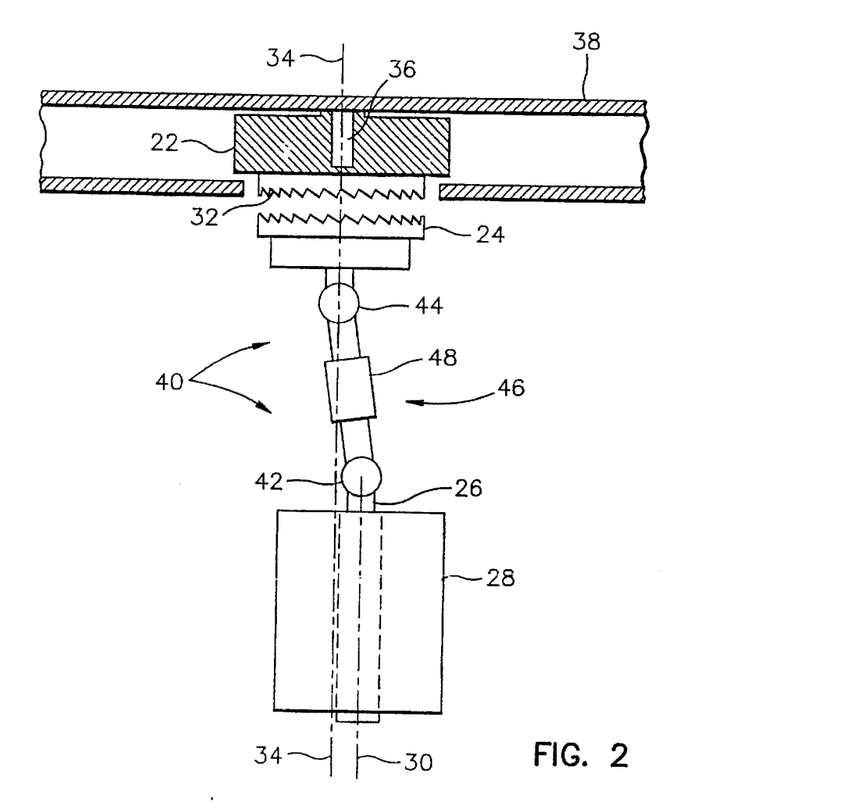
FIG. 2 is a schematic illustration explaining the principle of the present invention to overcome the off-center problem between the drive apparatus and the reel axle.

FIG. 2 illustrates the principle of the invention for aligning the drive shaft apparatus when there is a lateral offset between the motor axis 30 and the reel axis 34. This is accomplished by providing a flexible drive assembly 40 which interconnects the motor shaft 26 to the spider gear driver 24. The drive assembly 40 includes a pair of flexible joints 42 and 44 which interconnect one end of a drive shaft assembly 46 to the motor shaft 26 and the other end of the drive shaft assembly 46 to the spider gear 24. The drive shaft 46 may also be provided with a telescoping joint 48. Because of the flexing of the joints 42 and 44, the drive assembly 40 will now align to the reel axis 34 even though the reel axis 34 is offset from the motor shaft axis 30.

Figure 3:
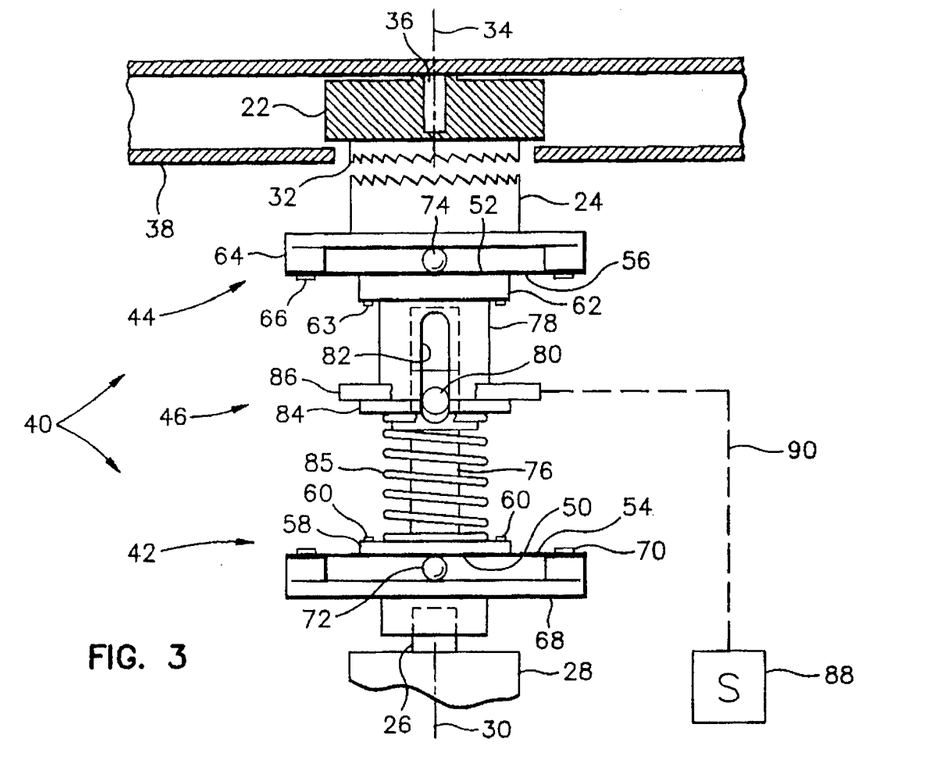
FIG. 3 is a schematic illustration of an embodiment of the present invention.

FIG. 3 is another schematic illustration showing further details of the present invention. As shown, the flexible drive assembly 40 includes a drive shaft assembly 46 which has opposite driving ends 50 and 52. A pair of flexible diaphragms 54 and 56 may be provided, each diaphragm having oppositely facing substantially flat sides which will be illustrated in more detail hereinafter. The diaphragms are flat when they are not flexed. The invention provides for connecting each diaphragm 54 and 56 to a respective shaft end 50 and 52 with a flat side of each diaphragm extending in a respective lateral plane, each respective lateral plane being substantially perpendicular to the axis of rotation 30 of the drive shaft 26. A mechanism for connecting the bottom shaft end 50 to the diaphragm 54 includes a hub 58 which is bolted to the diaphragm by bolts schematically illustrated at 60. The mechanism for connecting the other shaft end 52 to the diaphragm 56 includes a hub 62 which is bolted to the diaphragm 56 by bolts schematically illustrated at 63.

The spider gear 24 of the flexible drive shaft apparatus engages the reel spider gear 32 of the magnetic tape reel 22. The invention provides for connecting the spider gear 24 to the flexible diaphragm 56 in a position opposite the drive shaft end 52. This connection includes a yoke 64 which has its outer ends connected to the flexible diaphragm 56 at outer positions by any suitable means such as the bolts schematically illustrated at 66. The yoke 64 will be described in more detail hereinafter. Power means for the drive apparatus 40 is provided by a motor 28 with an output element, which may be the motor shaft 26. The invention provides for connecting the motor shaft 26 to the other flexible diaphragm 54. This connection includes another yoke 68, identical to the yoke 64, which has outer ends fixed to the flexible diaphragm 54 at outer locations by any suitable means such as the bolts schematically illustrated at 70.

It should be noted that the combined connections of the hub 58 and yoke 68 to the flexible diaphragm 54 provide for transmitting torsional force from the motor 28 to the drive shaft assembly 46 via the flexible diaphragm 54. In a similar manner, the combined connections of the hub 62 and the yoke 64 to the flexible diaphragm 56 provide for transmitting torsional force from the drive shaft assembly 46 to the spider gear 24 via the flexible diaphragm 56. The diaphragms 54 and 56 are, by design, very thin and will be described in more detail hereinafter. The thinness of their construction allows for the desired flexure to adapt for misalignment of the axes 30 and 34. However, because of this thin construction, the flexible diaphragms are especially vulnerable to axial forces exerted along the axes of rotation of the motor shaft 26, the drive shaft assembly 46 and the spider gear 24 (see FIG. 2). In order to overcome this problem, each of the flexible joints 42 and 44 has provision for transmitting thrust loads exerted along all of the aforementioned axes of rotation. Preferably, thrust loads are transmitted by a pair of spherical balls or ball portions 72 and 74, a flattened portion of each ball being centrally connected within respective yokes 68 and 64 by any suitable means, such as a epoxy bonding. A rounded portion of each ball 72 and 74 engages respective shaft ends 50 and 52 via hubs 58 and 62 to transmit axial loads from the motor shaft 26 to the drive shaft assembly 46 and then from the drive shaft assembly 46 to the combined yoke and spider gear 64 and 24. With this arrangement, axial stress is relieved on each of the flexible diaphragms 54 and 56.

FIG. 3 also schematically illustrates an exemplary drive shaft assembly 46 which telescopes for expanding or lengthening the distance between its ends 50 and 52. The telescoping is provided by a rod 76 which slidably reciprocates within a hollow cylinder 78, the rod 76 being fixed to the hub 58 and the hollow cylinder 78 being fixed to the hub 62. The rod 76 has a laterally extending pin 80 which rides in a slot 82 in the hollow cylinder 78. The hollow cylinder 78 may be provided with an annular outwardly extending collar 84. A compression spring 85 may be located between the flange 84 and the hub 58 for urging the drive shaft spider gear 24 into engagement with the reel spider gear 22. With the telescopic arrangement the flexible drive assembly 40 can apply the necessary thrust to make proper driving engagement between the spider gears 24 and 32. In order to disengage and withdraw the spider gear 24 from the reel spider gear 32 a retracting assembly may be operably connected to the telescoping drive shaft assembly 46 for selectively overcoming the compression spring and pushing the spider gear 24 toward the motor 28. This retracting assembly includes a yoke 86 which fits around the hollow cylinder 78 above the collar 84. The yoke 86 is connected to a longitudinal solenoid 88 by a shaft 90. When the longitudinal solenoid 88 is actuated, the yoke 86 is moved downwardly to bear on the collar 84 and thereby withdraw the spider gear 24 from the spider gear 32.

Figure 4:
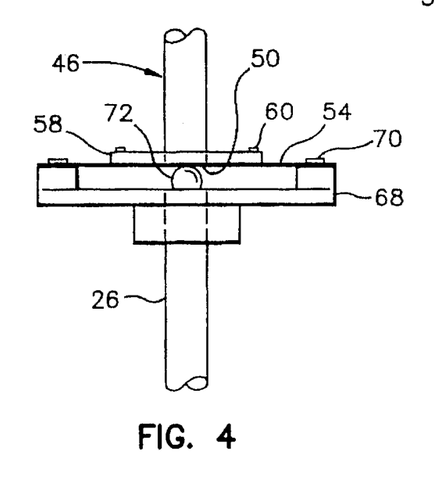
FIG. 4 is a schematic illustration of one of the flexible joints of the drive apparatus.

FIG. 4 is a simplified schematic illustration of one of the flexible joints showing the motor shaft 26 connected to the yoke 68, which in turn is connected to the diaphragm 54, which in turn is connected to the drive shaft assembly 46. It can be seen from this illustration how misalignment of the axes of shafts 26 and 46 will be absorbed entirely by the deflection of the flexible diaphragm 54. FIG. 3 also illustrates how damaging axial loads along these shafts could be to the diaphragm. This is overcome by the ball portion 72 which is fixed to the center of the yoke 68 for rolling action on the bottom end 50 of the drive shaft assembly 46. This rolling action is actually on the hub 58 which forms the end 50 of the drive shaft assembly 46. It is important that the spherical portion of the ball 72 engage the shaft end 50 in a plane which is substantially coplanar with a mid-plane between the two flat sides of the flexible diaphragm 54. This arrangement is illustrated in FIG. 4, the diaphragm 54 being represented by a thick line. With this arrangement there is only rolling action between the ball 72 and the shaft end 50 even though the flexible diaphragm 54 is deflected due to axis misalignment between the shafts 26 and 46. If this plane occurs above or below the flexible diaphragm 54 there will be an undesirable rubbing action between the ball portion 72 and the shaft end 50 resulting in wear and debris. The same arrangement is applicable to the other ball 74 and shaft end 52 with respect to the flexible diaphragm 56 (see FIG. 3).

Figure 5:
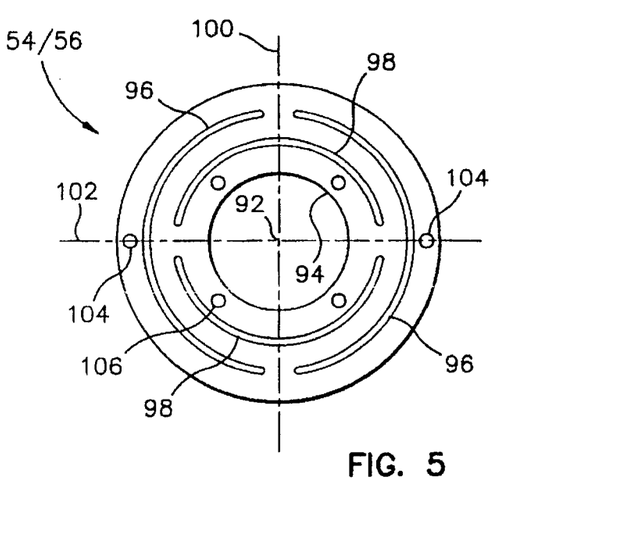
FIG. 5 is a planar view illustrating the details of one of the flexible diaphragms used for the joint of the drive apparatus.

A top view of one of the flexible diaphragms 54 or 56 is illustrated in FIG. 5. For description purposes the reference numeral 54 will be used, however, the description applies to both flexible diaphragms. As shown in FIG. 5, the diaphragm 54 is a substantially flat generally circular element with a central axis 92. The flexible diaphragm element 54 has a central aperture 94 with respect to the central axis 92 so that the ball portion 72 (see FIG. 4) makes direct engagement with the shaft end 50. The diaphragm element 54 has at least two pairs of arcuate apertures 96 and 98 about the central aperture 94, the arcuate length of the apertures in each pair being substantially equal. The apertures 98 of one pair extend along an inner circle and the apertures 96 of the other pair extend along an outer circle. The circles of both pairs are concentric with respect to each other about the central axis 92. The apertures in each pair are also symmetrical about the central axis 92 so as to define respective axes of symmetry 100 and 102 which equally bisect the arcuate length of the apertures of the respective pair of apertures. As shown in FIG. 5, these axes of symmetry 100 and 102 are offset 90 degrees from one another about the central axis 92. The diaphragm element 54 may further include a pair of mounting apertures 104 which are located outside the outer pair of apertures 96 in diametrically opposite directions from the central axis 92 along the symmetrical axis 102 of the outer pair of apertures 96. The diaphragm element may further include a plurality of mounting apertures 106 between the central aperture 94 and the inner circle aperture pair 98. Mounting apertures 104 may be for the passage of bolts 70 and 66 and the mounting apertures 106 may be for the passage of the bolts 60 and 63. It has been found that a diaphragm element constructed of stainless steel with a thickness between 0.002 to 0.010 inches provides optimum torsional and deflection performance. It should be understood that in some embodiments the diaphragms 54 and 56 and the apertures therein may be noncircular.

Figure 6:
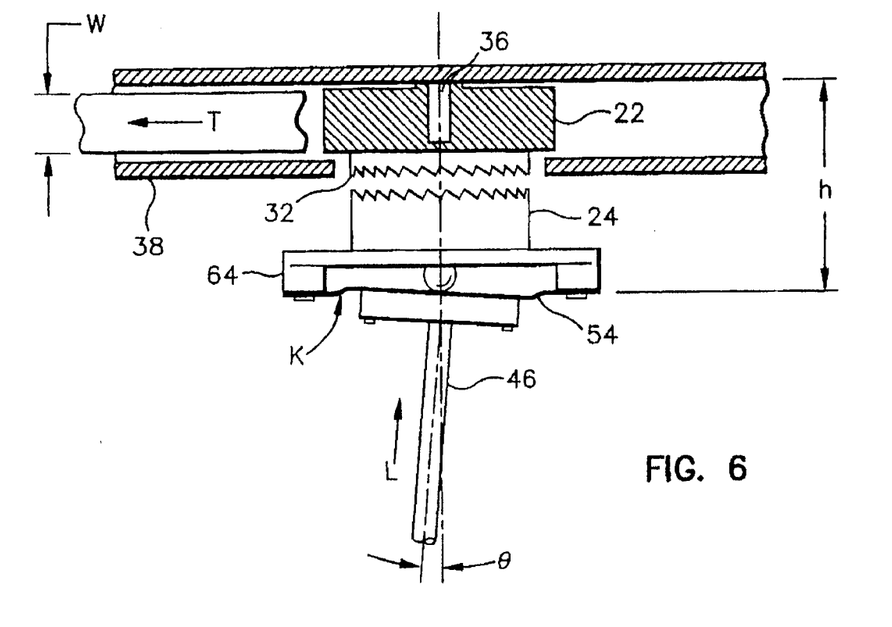
FIG. 6 is a schematic illustration of the drive apparatus engaging a magnetic tape reel for explaining the design parameters of the flexible diaphragm.

FIG. 6 illustrates exemplary design criteria for establishing the optimum thickness of a stainless steel flexible diaphragm 54 given certain parameters. The flexible joints 42 and 44 are torsionally stiff for transmitting rotational torque to the reels. They provide high torque, maintain good tension control, and eliminate torsional vibrations which would adversely affect tape speed and tension servo. The second kind of torque is a "reel tipping" torque, which is in a different direction. This tipping torque must be kept low so that the reels stay in a well defined unique position, and do not rock on their axles during use. This tipping torque is minimized by having the couplings deflect easily to accommodate axis offset. Also the total axial (thrust) load and the amount of offset affect the tipping torque. The net tipping torque on the reel has three components, namely: 1) the torque due to the tape tension which is $N_{ten}=Tw/2$ where T=tape tension and w=tape width; 2) the torque due to the off axis thrust load which is $N_{thr}=Lh \sin \theta$ where L=thrust load, h=pivot height and θ=deflection angle; and 3) torque due to the bending of the flexible diaphragm which is $N_{fx}=K\theta$ where K=deflection torque constant of the flexible diaphragm and θ=the deflection angle. The condition for stability is $N_{ten}>N_{thr}+N_{fx}$. Typical values for a magnetic tape reel cassette are maximum thrust load L of two newtons a maximum deflection angle θ of 1.6°, a tape width w of 8 mm, a maximum tape tension t of 2.5 oz and a pivot height h of 15 mm. It can be seen that the condition of stability is that the torque due to tape tension always dominates so as to bias the reel 22 into a constant position with respect to the axle 36. With the above parameters the torque due to tape tension is approximately 0.003N-m and the maximum torque due to off axis load is 0.0008N-m. For a 20 mm diameter flexible diaphragm the following deflection constants have been obtained, namely: 1) 0.0001N-m/deg for 0.003 inch thick high strength stainless steel and 2) 0.0008 for 0.005 inch thick high strength stainless steel. Allowing 1.6° of deflection in any direction it is clear that either of these two thin stainless flexible diaphragms are adequate to prevent reel tipping. The optimum for these conditions is to use 0.005 inch material since durability and rotational stiffness are maximized without allowing reel tipping.

Figure 7:
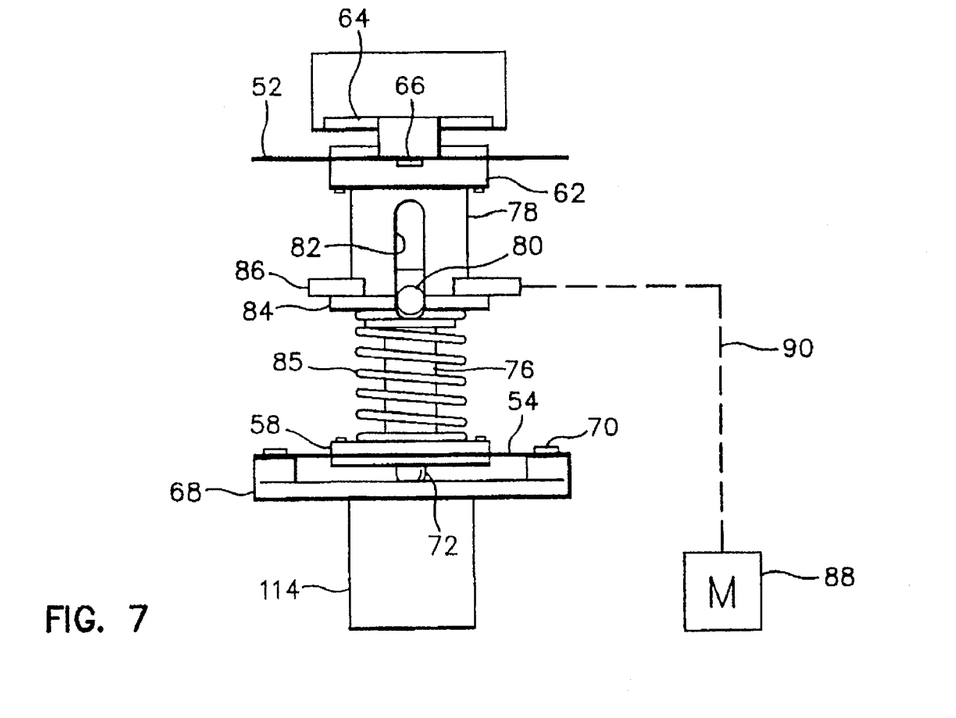
FIG. 7 is a side view of the flexible shaft drive apparatus.
Figure 8:
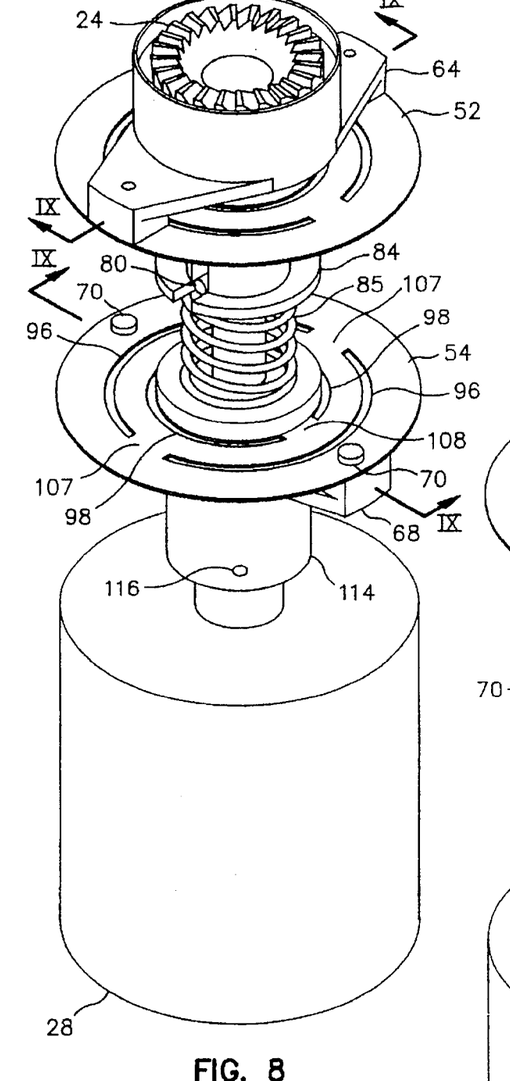
FIG. 8 is a isometric view of the flexible shaft drive apparatus.
Figure 9:
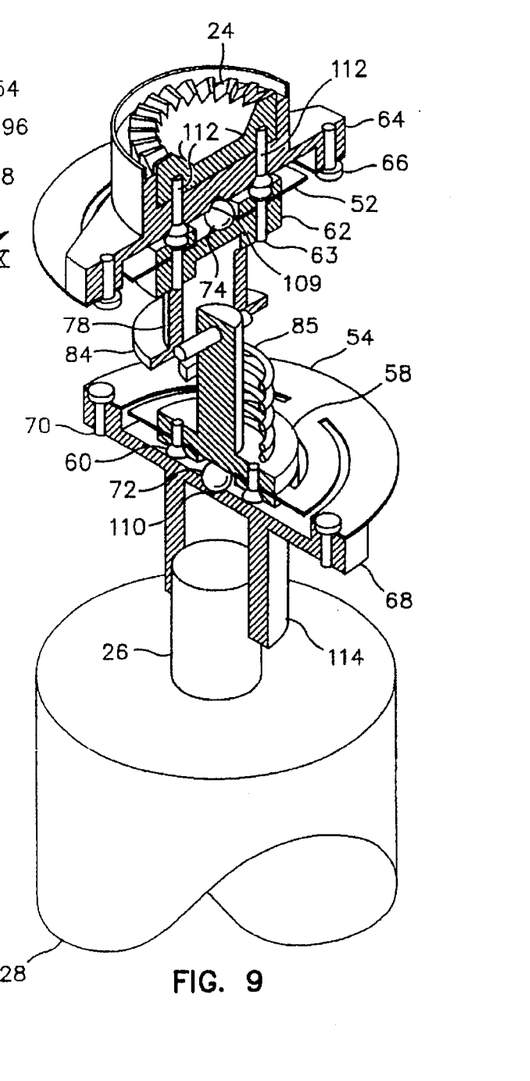
FIG. 9 is an isometric view of the flexible shaft drive apparatus with portions cut away generally along planes IX of FIG. 8 to show various details thereof.

Additional details of the invention are illustrated in FIGS. 7, 8 and 9. As shown in FIG. 8, it is desirable that the bolts 70 fix the flexible diaphragm 54 to the yoke 68 along the axis of symmetry 102 (see FIG. 5) which bisects the outer ring of apertures 96. With this arrangement, flexure of the diaphragm 54 is optimized with resistance to flexure being solid portions 107 of the diaphragm between the apertures 96 when the deflection is about the axis of symmetry 100 (see FIG. 5) of the apertures 98. When the deflection is about the axis of symmetry 102 (see FIG. 5) of the apertures 96, the torsional force is transferred from the solid portions 107 between the apertures 96 to solid portions 108 between the apertures 98, again resulting in good deflection characteristics. Because of the solid portions 107 and 108 between the pairs of apertures 96 and 98 good driving force can be achieved even though the flexible diaphragm has been deflected. The same holds true for the flexible diaphragm 52. As shown in FIG. 9, the balls 72 and 74 may be whole instead of partial and may be fixed within respective collar recesses 109 and 110 by any simple means such as epoxy bonding. Also, as shown in FIG. 9, the spider gear 24 may be fixed to the collar 64 by bolts 112. As shown in FIGS. 8 and 9, the output shaft 26 of the motor may be fixed to the yoke 68 by a sleeve 114 and a setscrew or pin 116. FIG. 7 shows the yoke 86 engaging the collar 84, and operable by the solenoid 88 to overcome the spring 85 and retract the spider gear 24 when desired. FIGS. 8 and 9 clearly show that the yoke 68 holds only a small portion of the outer annular ring of the diaphragm 54 rigid while the hub 58 holds the entire inner annulus of the diaphragm rigid. The same arrangement also applies to the other diaphragm 52.

Figures 10, 11, 12, 13:
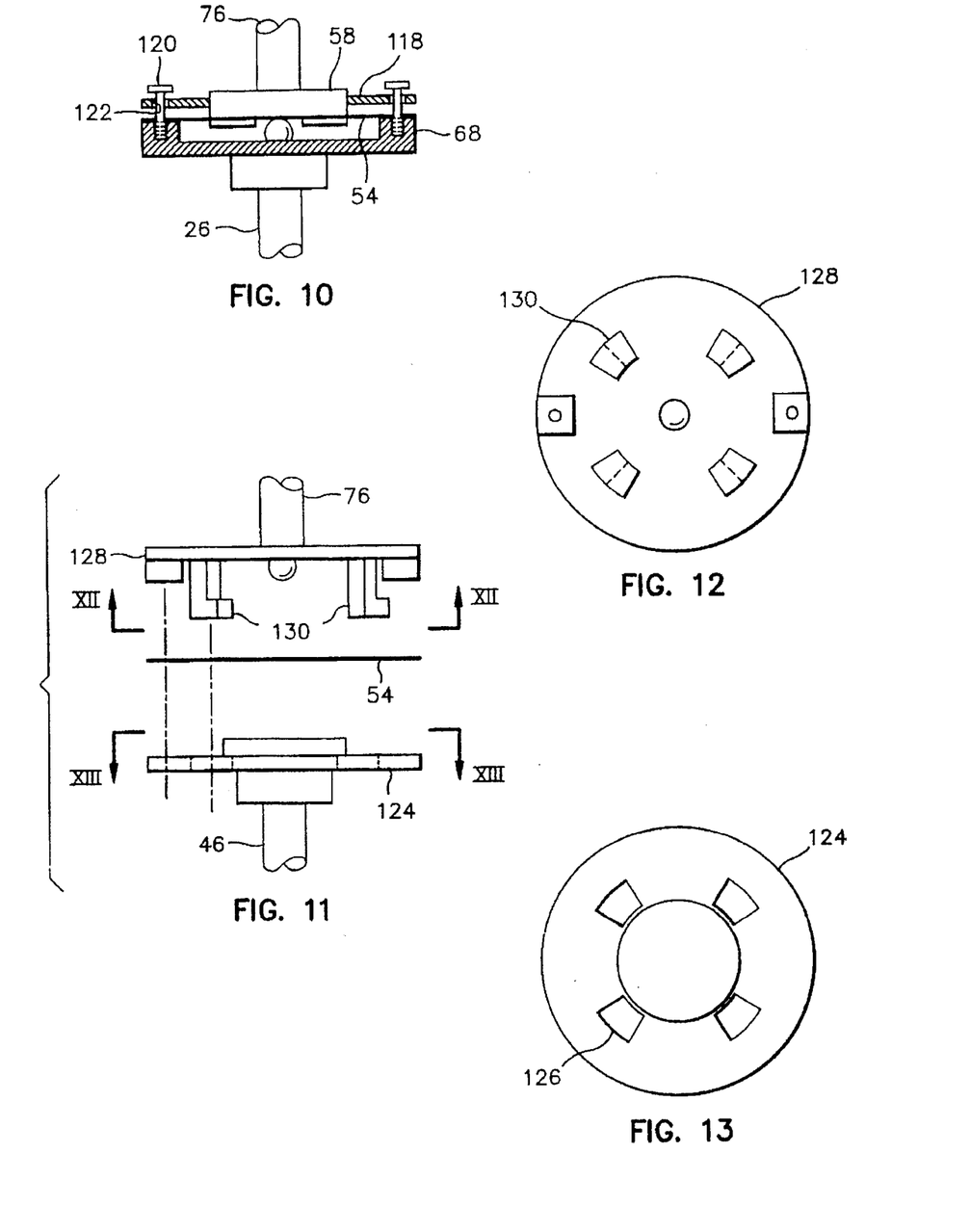
FIG. 10 is a schematic illustration showing one type of stops for limiting the angle of deflection of the flexible diaphragm.
FIG. 11 is an exploded schematic illustration showing another type of stop for limiting the angle of deflection of the flexible diaphragm.
FIG. 12 is a view taken along plane XII—XII of FIG. 11.
FIG. 13 is a view taken along plane XIII—XIII of FIG. 11.

FIGS. 10 and 11 schematically illustrate a stopping mechanism for each of the flexible joints 42 and 44 (see FIG. 3) for limiting the angles of deflection between the flexible diaphragms 54 and 56 and the drive shaft means 46. As shown in FIG. 10, the stopping mechanism includes a plate 118, which is rigidly fixed in a lateral position to the hub 58, and bolts 120 which extend through plate apertures 122 and are threaded into the collar 68. The holes 122 provide a clearance with respect to the bolts 120 so that the flexible diaphragm 54 can deflect until the plate 118 engages the bottom of one of the bolt heads. This is one possible stopping mechanism for the embodiment of the invention shown in FIGS. 3, 7, 8 and 9. Another possible stopping mechanism is shown in FIG. 11, 12 and 13 where, instead of a yoke 68, a circular plate 124 with slots 126 may be laterally connected to the motor shaft 26. Instead of the hub 58, shown in FIGS. 3, 7, 8 and 9, a plate 128 may be connected to the bottom of the rod 76 with hooks 130 which project into the slots 126. When this stopping mechanism is assembled, deflection of the flexible diaphragm 54 beyond a certain point will result in one of the hooks 130 engaging the bottom of the plate 124 and limiting the deflection angle. It should be noted that this latter stopping mechanism suggests that the hubs 58 and 62 could be switched with the yokes 64 and 68 respectively and still be within the spirit of the invention.

Figure 14:
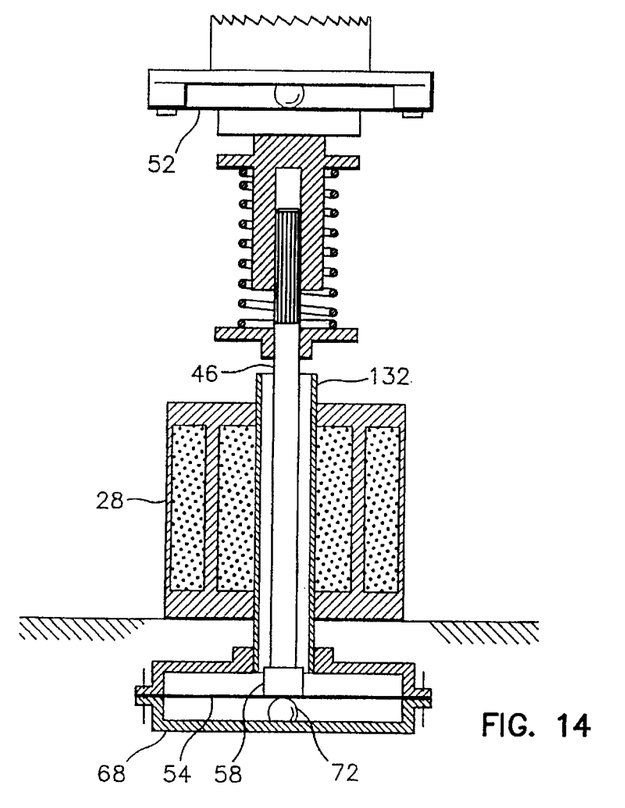
FIG. 14 is a schematic illustration of a modification of the invention where a hollow shaft of a motor is mounted about a drive shaft to minimize the length of the drive apparatus.

Still another modification of the invention is illustrated in FIG. 14 where the motor 28 is provided with a hollow shaft 132. The member 68 may be annular elements which contain the flexible diaphragm 54 and the ball portion 72, and may form a hub for connection to the bottom of hollow shaft 132. The drive shaft assembly 46 is connected to the flexible diaphragm 54 by the hub 58 and extends axially through the hollow motor shaft 132 for connection to the flexible diaphragm 52. This modification of the invention will result in a reduced height of the flexible drive shaft apparatus for operation in confined spaces. Further, when space is limited, there may not be enough room between the motor and the tape reel to have a suitable length for the intermediate axle 46 (in FIG. 3, for example). If the intermediate axle is very short, then for a given offset, the angle of deflection theta (in FIG. 6) is larger than for longer intermediate axles. As theta gets large, two bad effects occur: The tipping torque increases, and the diaphragm becomes less planar, reducing its torsional stiffness. Accordingly, the modification can also be used to provide a longer length between flexures to reduce angles of deflection.

Figure 15:
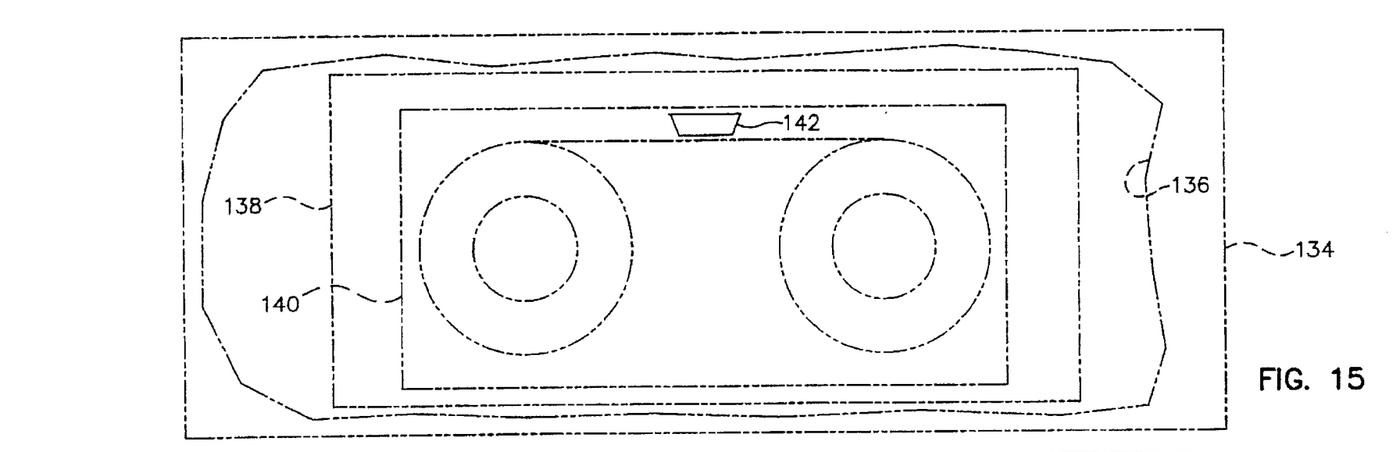
FIG. 15 is a schematic illustration of a tape drive system which has a tape cassette receptacle, a pair of the drive shaft apparatuses and devices for extending and retracting the drive shaft apparatuses with respect to the reel axles.
Figure 16:
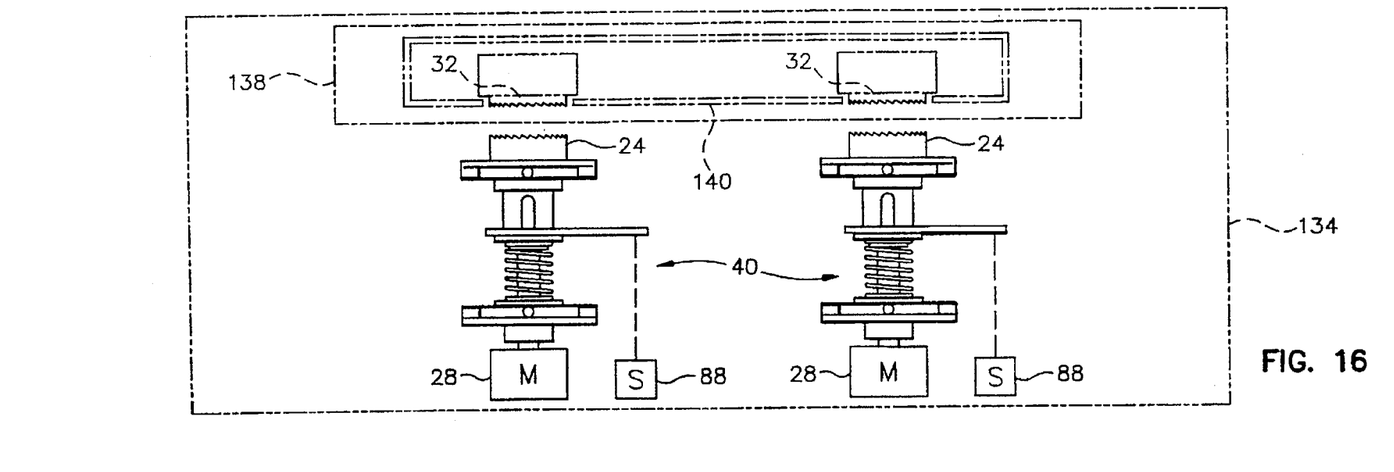
FIG. 16 is a schematic illustration of the top of FIG. 13.
Figure 17:
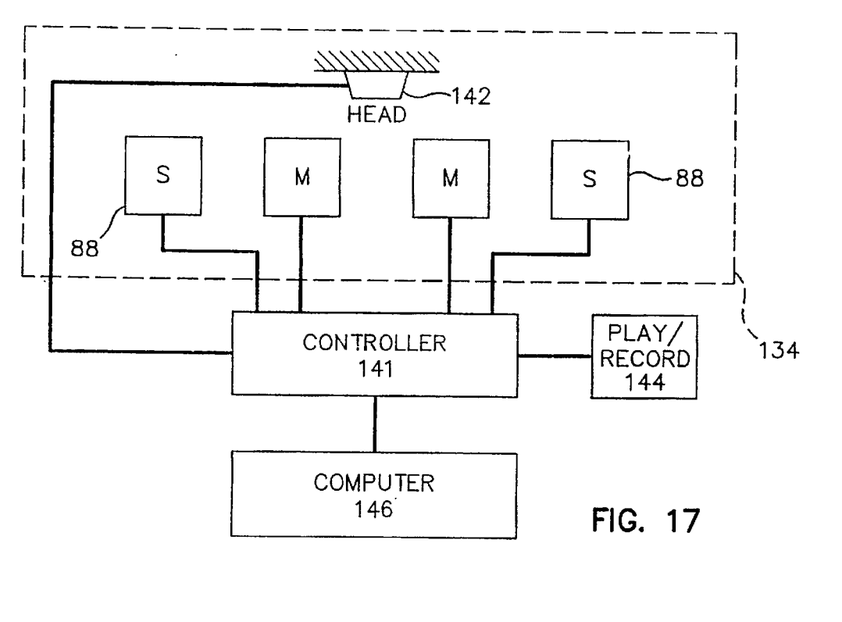
FIG. 17 is a block diagram of an exemplary system for operating a magnetic tape cassette for various play and/or record functions.

FIGS. 15, 16 and 17 illustrate the present invention being employed in a system for operating recordable media, such as a magnetic tape cassette. The system may perform a number of functions such as playing or recording on a magnetic tape, wind and rewind functions and retracting the flexible drive apparatus from the magnetic tape cassette. As shown in the figures, the system includes a tape drive, with a cabinet 134 shown with a top cut away 136. A conventional receiving mechanism 138 is mounted in the cabinet 134 for receiving a magnetic tape cassette 140. The cassette has the aforementioned spider gears 32 which are connected to the tape reels. The spider gears 24, which are connected to a pair of spaced apart flexible drive assemblies 40, engage the spider gears 32 to tape in the cassette 140 according to the teachings of the present invention. The motors 28 and the solenoids 88 may be fixed to the bottom of the cabinet, as shown in FIG. 15. The motors 28 are provided with on, off and variable speed modes. As shown in FIG. 17, a controller 141 is connected to the motors 28 for controlling these modes. Further, the controller may be connected to the solenoids 88 for controlling retraction of the flexible drive shaft spider gears 24 from the magnetic tape cassette spider gears 32. As shown in FIGS. 16 and 17 a read/write transducer head 142 is mounted within the cabinet 134 for conventional operation with respect to the magnetic tape of the cassette 140. The controller 141 may also be connected to this head 142 for operating play/record components 144. If automation is desired an appropriately programmed computer 146 may be connected to the controller 140 for performing various drive operations.

It is readily apparent that the present invention is particularly useful for reliably driving magnetic tape cassettes when there is a misalignment between the tape cassette and the drive mechanism. It is to be understood however, that the invention could also be used for magnetic and optical disk drives as well as other articles, such as precision test or tool equipment, which need to be reliably rotated even though there is axial misalignment. The invention is especially capable of delivering high rotational torque with an accompanying very small angular torque due to deflection. This has been accomplished by components which are unique in and of themselves as well as by an overall unique combination of elements. The invention is especially adaptable for the embodiment shown in FIGS. 15, 16 and 17 where a reliable tape path is necessary. Further, the invention prevents wear of the components and the resulting debris which shortens the life of the system.

Although the invention has been described in terms of the specific embodiment, the inventors contemplate modifications and substitutions to various components of the invention would occur to the person of ordinary skill in the art and, therefor, would be in the scope of the invention, which is to be limited only by the claims which follow.

We claim:

1. A high torsional stiffness low axial deflection stiffness flexible drive shaft comprising:

at least one flexible diaphragm for transmitting torsional loads;

first and second elongated driving elements for transmitting axial and torsional loads along and about a common axis respectively, the common axis being common to a longitudinal axis of each of the first and second elongated driving elements;

the first driving element being fixedly connected to only an inner radial portion of the flexible diaphragm, which is defined by a first circle about the common axis, and the second driving element being fixedly connected to only an outer radial portion of the flexible diaphragm, which is defined by a second circle about the common axis wherein the second circle is larger than the first circle, so that the diaphragm has an annular band between said inner and outer radial portions without any connections; and axial load transmitting means mounted to one of the first and second driving elements and having a rounded portion movably engaging the other of the first and second driving elements for transmitting axial loads therebetween, whereby, upon rotation of the drive shaft, the annular band transfers torsional force and adjusts for any misalignment of the longitudinal axes of the first and second driving elements.

2. A drive shaft as claimed in claim 1 including:

the diaphragm having a central aperture; and the axial load transmitting means movably engaging said other of the first and second driving elements through the central aperture of the diaphragm.

3. A high torsional stiffness low axial deflection stiffness flexible drive shaft for driving recordable media comprising:

top and bottom shafts which are in axial alignment with respect to one another along a common axis;

only one flexible diaphragm located between a top end of the bottom shaft and a bottom end of the top shaft, the diaphragm having top and bottom planar surfaces which extend perpendicular to said common axis;

means fixedly connecting the top shaft to the flexible diaphragm at discrete locations along a first circle which is substantially centered about said common axis;

means fixedly connecting the bottom shaft to the flexible diaphragm at discrete locations along a second circle which is substantially centered about said common axis;

the first and second circles having different diameters so that the flexible diaphragm has an annular band therebetween;

an element mounted on one of the top end of the bottom shaft and the bottom end of the top shaft and having a rounded portion which bears on the other of the top end of the bottom shaft and the bottom end of the top shaft, whereby upon rotation of either shaft and/or the shafts are misaligned said band transfers torsional force to the other shaft and/or flexes due to misalignment.

4. A drive shaft as claimed in claim 3 wherein the rounded portion of the element bears on an end of a respective shaft at a location between and inclusive of the top and bottom planes of the diaphragm.

5. A drive shaft as claimed in claim 4 wherein the rounded portion of the element is at least a portion of a spherical ball.

6. A drive shaft as claimed in claim 5 wherein said at least a spherical ball portion of the element bears on an end of a respective shaft when the diaphragm is in an unflexed planar condition and rollably bears on the respective end of the shaft when the diaphragm has been forced to a flexed nonplanar condition by misalignment of respective shafts.

7. A drive shaft as claimed in claim 6 wherein the diaphragm is stainless steel and has a thickness in the range of 0.002 to 0.010 inches.

8. A drive shaft as claimed in claim 7 wherein the diaphragm has only two pairs of arcuate apertures, each pair of arcuate apertures being symmetrically arranged on the diaphragm with symmetrical axes of the paris of arcuate apertures being perpendicular to one another.

9. A high torsional stiffness low axial deflection stiffness flexible drive shaft for driving recordable media comprising:

at least one flexible diaphragm for transmitting torsional loads;

first and second driving elements for transmitting axial and torsional loads;

the first driving element being fixedly connected to an inner portion of the flexible diaphragm along a first circle which is substantially centered about the first driving element and the second driving element being fixedly connected to an outer portion of the flexible diaphragm along a second circle which is substantially centered about the second driving element;

the first circle having a smaller diameter than the second circle and being substantially concentric therewith so that the flexible diaphragm has an annular band therebetween; and axial load transmitting means mounted to one of the first and second driving elements and having a rounded portion movably engaging the other of the first and second driving elements for transmitting axial loads therebetween, whereby upon rotation of the drive shaft the annular band transfers torsional force and adjusts for any misalignment of the first and second driving elements.

10. A drive shaft as claimed in claim 9 including:

each of the first and second driving elements being rigidly connected to said at least one diaphragm.

11. A drive shaft as claimed in claim 10 including:

the first driving element being connected by a boss to the inner portion of the diaphragm and the second driving element being connected by a yoke to the outer portion of the diaphragm.

12. A drive shaft as claimed in claim 11 including:

said at least one flexible diaphragm having first and second oppositely facing substantially flat surfaces; and said boss having a flat surface which is located between and inclusive of the flat surfaces of said flexible diaphragm.

13. A drive shaft as claimed in claim 12 including:

said rounded portion being a spherical portion.

14. A drive shaft as claimed in claim 13 including:

said axial load transmitting means being mounted to the second driving element with its spherical portion rotatably bearing on the flat surface of said boss.

15. A drive shaft as claimed in claim 14 including:

said at least one flexible diaphragm having only two pairs of arcuate apertures, each pair of arcuate apertures being symmetrically arranged on the flexible diaphragm with symmetrical axes of the pairs of arcuate apertures being perpendicular to one another.

16. A drive shaft as claimed in claim 15 including:

the flexible diaphragm being stainless steel and having a thickness in the range of 0.002 to 0.010 inches.

* * * * *